United States Patent [19]

Lin

[11] Patent Number: 5,317,418

[45] Date of Patent: May 31, 1994

[54] HALFTONE IMAGES USING SPECIAL FILTERS

[75] Inventor: Qian Lin, Santa Clara, Calif.

[73] Assignee: Hewlett-Packard Company, Palo Alto, Calif.

[21] Appl. No.: 60,285

[22] Filed: May 11, 1993

[51] Int. Cl.$^5$ .............................................. G03F 3/08
[52] U.S. Cl. .................................. 358/456; 358/457; 358/455
[58] Field of Search .............. 358/445, 446, 456, 457, 358/458, 459, 448, 429; 382/54

[56] References Cited

U.S. PATENT DOCUMENTS

| | | | |
|---|---|---|---|
| 4,532,651 | 6/1985 | Pennebaker, Jr. | 382/54 |
| 4,736,254 | 4/1988 | Kotera | 358/283 |
| 5,027,078 | 6/1991 | Fan | 358/456 |
| 5,053,887 | 10/1991 | Thompson | 358/457 |
| 5,107,346 | 4/1992 | Bowers | 358/447 |
| 5,111,310 | 5/1992 | Parker et al. | 358/456 |

OTHER PUBLICATIONS

Floyd et al.; "An Adaptive Algorithm for Spatical Greyscale", Proceedings of the Society for Information Display, vol. 17, 1986, pp. 75-77.

Ulichney; "The Void-and-Cluster Method for Dither Array Generation", SPIE/IS&T Symposium on Electronic Imaging Science and Technology, San Jose, California 1993.

Primary Examiner—Mark R. Powell
Assistant Examiner—John Ning

[57] ABSTRACT

A method of generating a halftone image from a grey scale image by means of a dither matrix. The matrix includes many patterns Each pattern corresponds to one grey level of the grey scale image. The value of each element in each pattern depends on a special positive filter with a single peak and a region-of-support. The peak is approximately at the center of the region-of-support. One preferred filter is a guassian filter. For a given pattern, the region-of-support of the filter depends on the average separation of the elements with values equal to one in that pattern; and the elements with values equal to one are substantially uniformly distributed across the pattern.

19 Claims, 16 Drawing Sheets

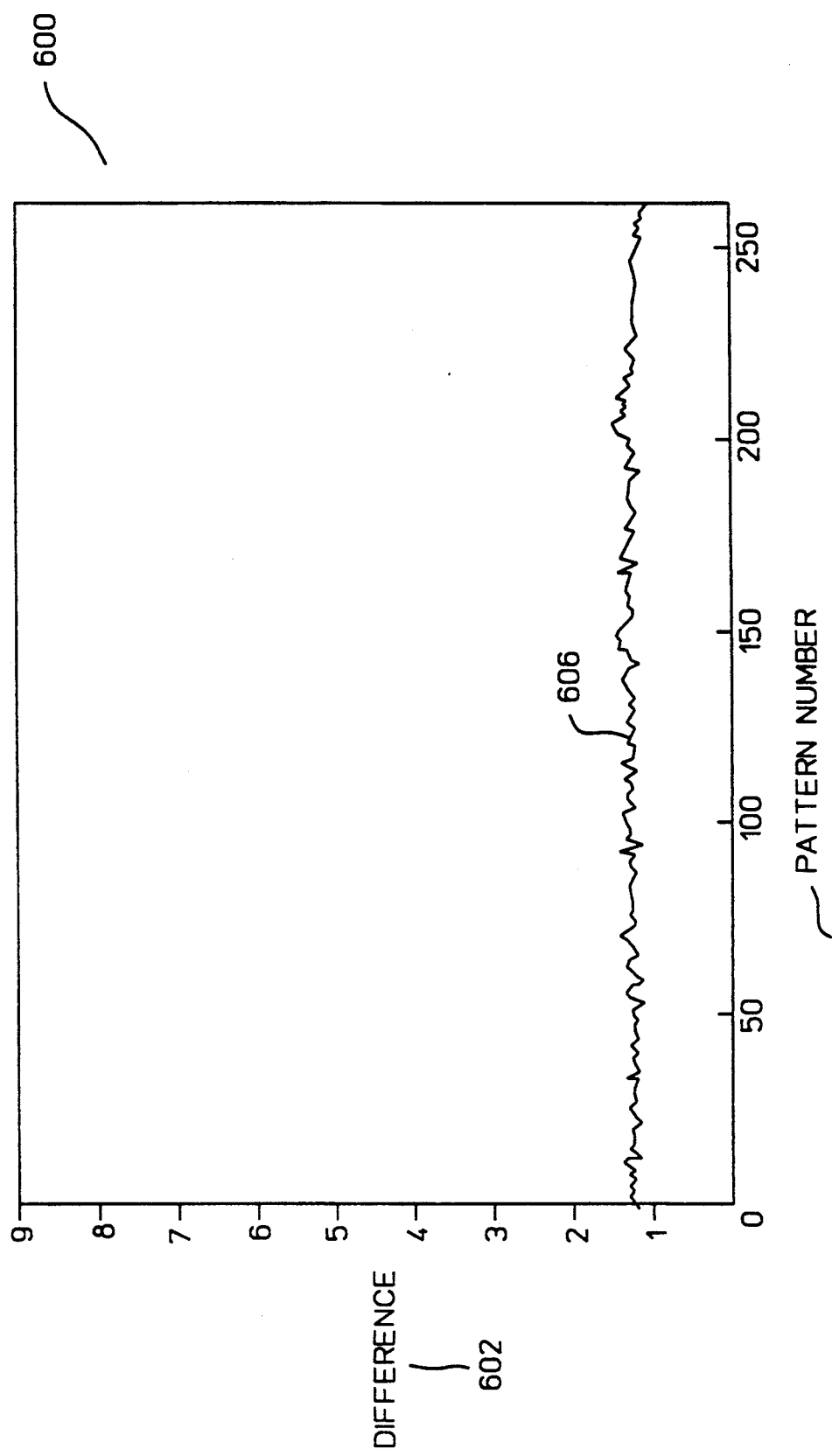

HALFTONE IMAGES USING SPECIAL FILTERS

BACKGROUND OF THE INVENTION

The present invention relates generally to halftone images and more particularly to methods of generating halftone images by a dither matrix. A printer can be designed to print a picture as a halftone or a grey scale image. For a halftone image, each pixel of the image either has a dot printed or not printed. For a grey scale image, each dot on a pixel is further refined to have one of many grey levels.

A halftone image is usually easier and cheaper to generate than a grey scale image. Many relatively low cost printers are specifically designed to print halftone images. To use such a printer to print a grey scale image, the image must first be transformed to a half tone image. One objective of the printing industry is to develop appropriate transformation techniques so that the halftone image becomes visually indistinguishable from the grey scale image.

One prior art method transforms a grey scale image to a halftone image by means of a dither matrix. The grey scale image has many grey levels and many pixels. Each pixel has a value. The dither matrix occupies a physical space and has numerous elements. Each element also has a value. This matrix is mapped over the grey scale image to generate the halftone image. For a grey scale image that is larger than the space occupied by the dither matrix, the matrix replicates itself to cover the entire image. Each pixel in the grey scale image is compared to an element in the matrix. If the grey scale image pixel has a larger value, a dot will not be printed in a corresponding position in the halftone image. The halftone image created has the same number of grey level patterns as the number of grey levels in the grey scale image. A darker area in the grey scale image is represented in the halftone image by a grey level pattern with more dots.

In order to generate a halftone image using the above method, the dither matrix must be carefully designed. The elements in the matrix should not be generated by a random number generator, because a fully random pattern would create a halftone image that is noisy, corrupting the content of the image.

One prior art method of designing this matrix is known as the void-and-cluster method. A general discussion of the void-and-cluster method can be found in "The Void-and-Cluster Method for Dither Array Generation," written by Robert Ulichney, and published in SPIE/IS&T Symposium on Electronic Imaging Science and Technology, San Jose, Calif., 1993. FIG. 1A shows a grey level pattern of a halftone image generated by the void-and-cluster method. The Figure was printed by a 600 dots-per-inch printer. To enhance the image, each printed dot is magnified nine times, with the image duplicated 4 times, once along the horizontal direction, and then along the vertical direction. The pattern represents a highlight region of the halftone image, which means a light grey level pattern. The pattern has significant non-uniformities, such as the voids in positions S1, S2, S3 and S4. These non-uniformities distort the halftone image.

Another prior art uses an error diffusion method to generate the halftone image This method analyzes every pixel of the grey scale image, one at a time, to decide if a dot is to be printed in its halftone image. Errors from each pixel is "diffused" to its subsequent neighboring pixels. Such pixel-to-pixel calculation requires very intensive computation. Thus, the error diffusion method takes much longer time to generate the halftone image than a method applying the dither matrix. Moreover, the error diffusion method is not suitable for vector graphics. This is because the values of pixels on a halftone image may not be calculated sequentially. A discussion of such a method can be found in "An Adaptive Algorithm for Spatial Grayscale," written by Floyd and Steinberg, and published in the Proceeding of the Society for Information Display, Vol. 17, page 75-77, 1976.

There is still a need for a way to generate a halftone image from a grey scale image without very intensive computation. The method should be suitable for both raster or vector graphics. Furthermore, it is desirable if there is a way to minimize non-uniformities in the grey level patterns of the halftone image.

SUMMARY OF THE INVENTION

The present invention provides a method of generating a halftone image from a grey scale image using a dither matrix. The value of every pixel in the halftone image is determined by a direct comparison of the value in a pixel of the grey scale image to the value in an element of the matrix, without the need for intensive computation. The method is suitable for both raster and vector graphics. Moreover, the grey level patterns of the halftone image is substantially uniform.

Briefly and in general terms, each of the halftone image, the grey scale image and the dither matrix occupies a physical two-dimensional area. The three areas are substantially equal to each other.

Both the halftone image and the grey scale image have many pixels, and each pixel has a value. The dither matrix has many elements. Each element also has a value and occupies a position in the dither matrix area.

The invented method compares the value of each pixel of the grey scale image with the value of an element in the dither matrix. Based on the result of the comparison, the value of a corresponding pixel of the halftone image is determined.

The dither matrix is generated by many patterns. Each pattern corresponds to one grey level pattern of the halftone image. Each pattern has many elements, and each element has a value. The value of each element in a given pattern is determined by a special filter. The special filter is a positive filter, with a peak and a region-of-support. The peak of the filter is approximately at the center of the region-of-support. For a given pattern, the region-of-support is dependent on the average separation of a pre-selected value in that pattern, and all elements having the preselected value are substantially uniformly distributed across the pattern.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 1B-C show two patterns of the dither generated by the present invention.

FIG. 14 shows a difference graph of the present invention.

DESCRIPTION OF THE PREFERRED EMBODIMENT

The present invention provides a method of generating a halftone image from a grey scale image using a dither matrix. In the prior art methods, either intensive computation is required to generate each pixel of the halftone matrix, or some grey level patterns of the halftone image have significant non-uniformities.

In the present invention, the value of every pixel in the halftone image is determined by a direct comparison of a pixel in the grey scale image to a value in the matrix, without the need for intensive computation at every pixel. The method is suitable for both raster and vector graphics, because one does not have to sequentially compare pixels in the grey scale image to elements in the matrix. Moreover, the grey level patterns of the halftone image are substantially uniform.

Figure 2:
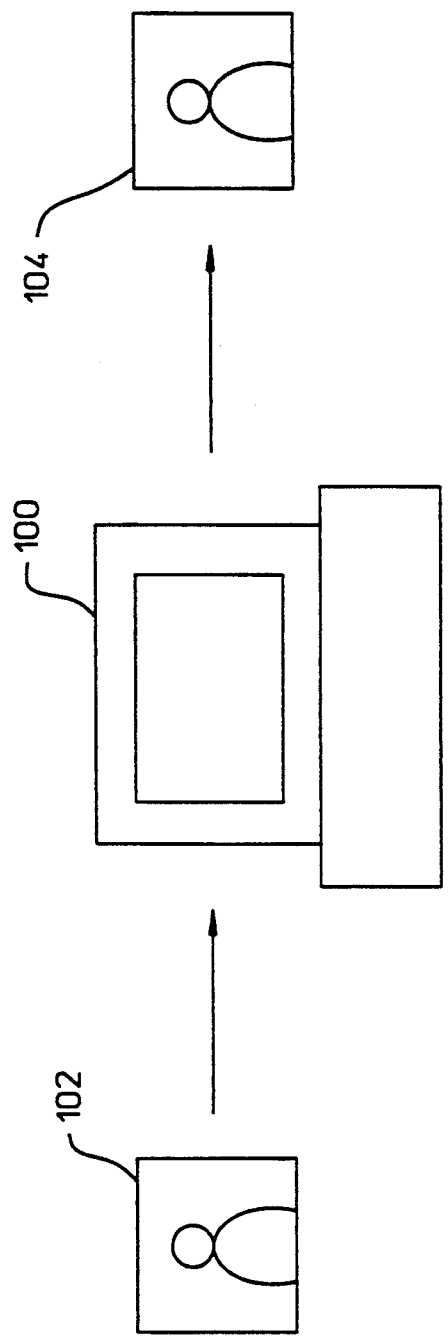
FIG. 2 shows a computer system incorporating the present invention to convert a grey scale image to a halftone image.
Figure 3:
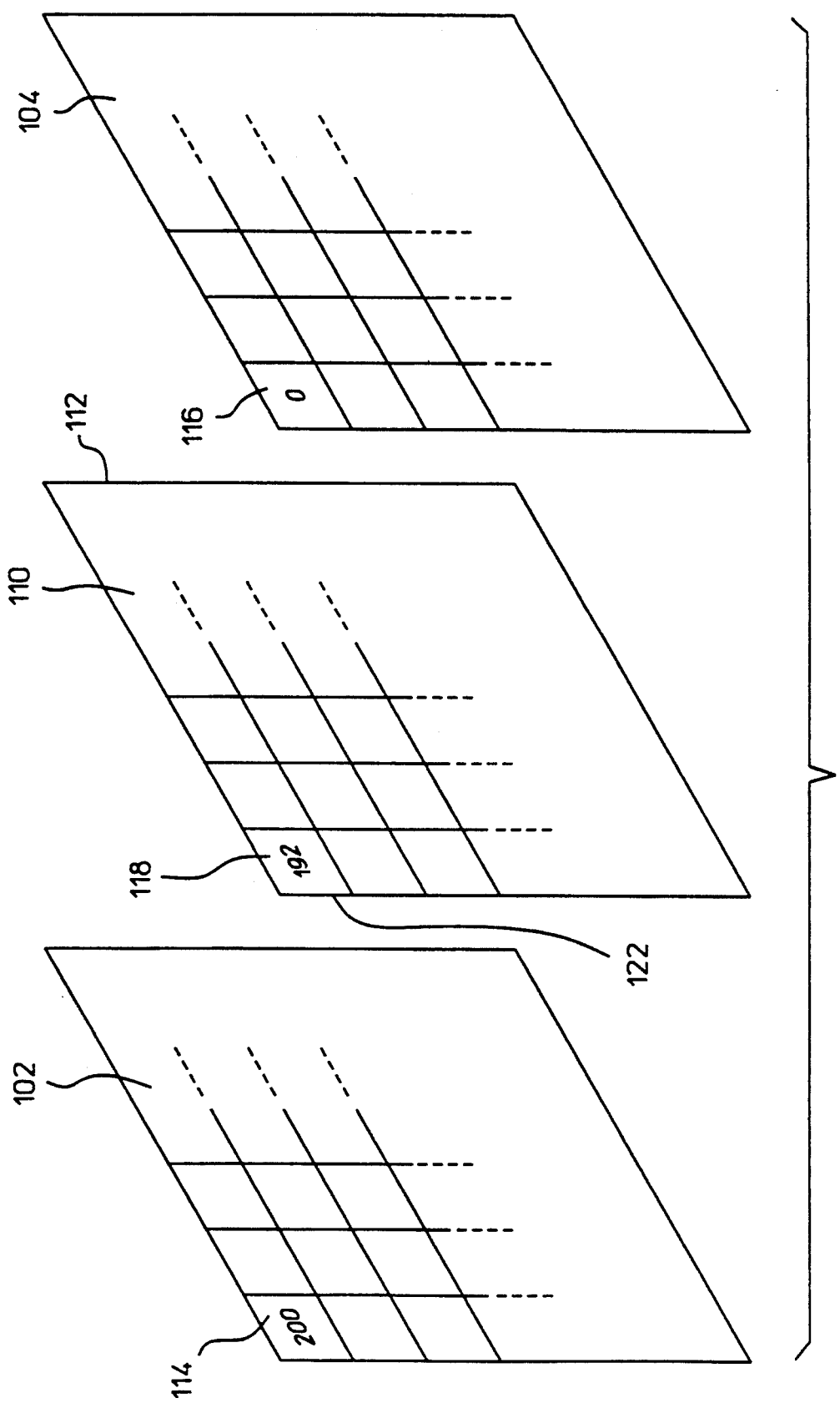
FIG. 3 shows the halftone image generated from the grey scale image using a dither matrix of the present invention.

FIG. 2 shows a computer system 100 incorporating the present invention to convert a grey scale image 102 to a halftone image 104. FIG. 3 shows a preferred dither matrix 110 used by the computer system 100 to generate the halftone image 104. Each of the halftone image 104, the grey scale image 102 and the dither matrix 110 occupies an area; for example, the dither matrix 110 occupies an area 112. The three areas are substantially equal to each other. The area occupied by the dither matrix is small, for example, 0.5 cm by 0.5 cm. If the grey scale image is larger in size than the dither matrix 110, the dither matrix 110 replicates itself to cover the area of the grey scale image.

Both the halftone image 104 and the grey scale image 102 have many pixels, such as the grey scale image pixel 114 and the halftone image pixel 116. Each pixel has a value; for example, the grey scale image pixel 114 has a value of 200 and the halftone image pixel 116 has a value of 0. The dither matrix 110 has many elements, such as the element 118. In one preferred embodiment, the matrix has 128 rows by 128 columns of elements. Each element has a value and occupies a position in the dither matrix area; for example, the element 118 has a value 192, and occupies a position 122.

Both the grey scale and the halftone images may be in black-and-white or color. One preferred way to represent color is to have three dots for each pixel, with each dot having a different color.

The preferred method of generating the halftone image 104 includes the steps of comparing the value of each pixel of the grey scale image 102 with the value of an element in the dither matrix. Based on the result of the comparison, the value of a corresponding pixel of the halftone image 104 is determined. For example, the value 200 of the grey scale image pixel 114 is compared to the value 192 of the element 118. Based on the comparison, the value of the pixel 116 is determined to be a minimum value, such as 0, which means that a dot will not be printed at that pixel.

Figure 4:
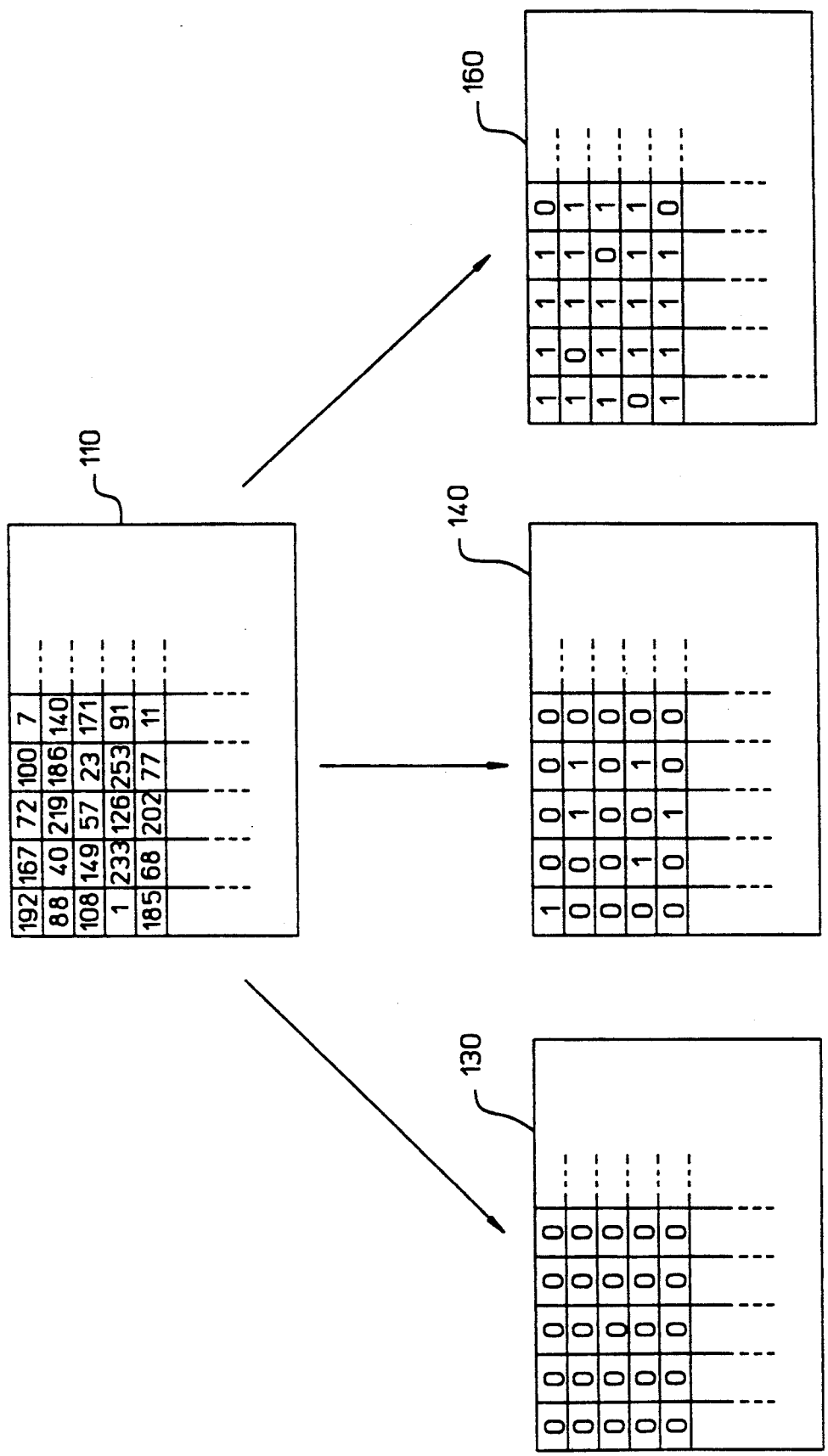
FIG. 4 depicts a portion of the invented dither matrix with many patterns.

FIG. 4 shows a portion of the dither matrix 110. The matrix is made up of many patterns, such as 130, 140 and 160. Every pattern is of the same size and with the same number of elements as the dither matrix For example, all the values of the element in the pattern 130 are zeros, and the values of elements in the pattern 160 have more ones than those in the pattern 140. Though the values of the elements are either one or zero in the present example, other maximum and minimum values can be used.

Figure 5:
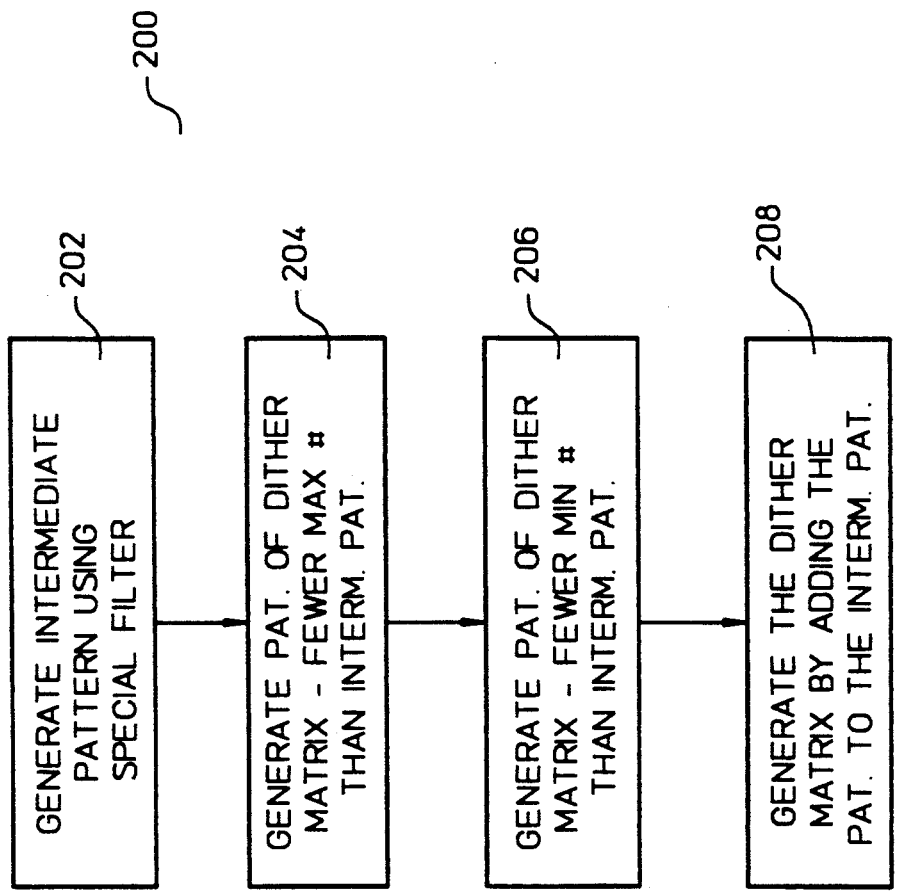
FIG. 5 shows the steps to generate the dither matrix of the present invention.
Figure 6:
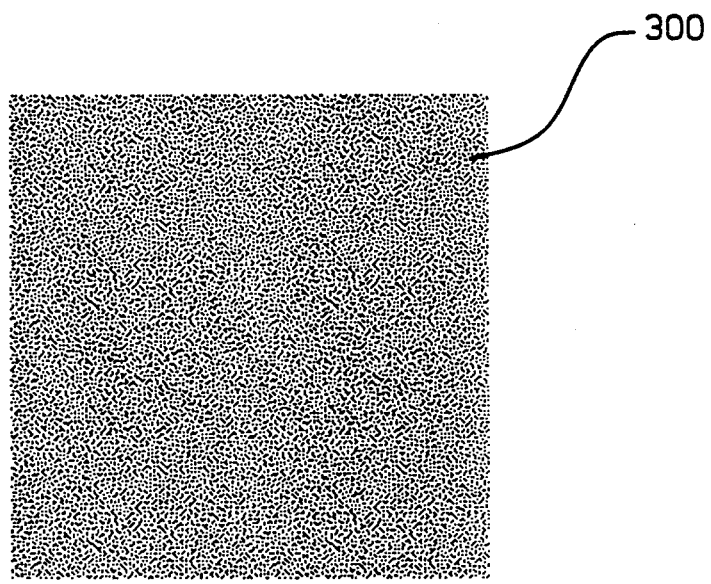
FIG. 6 shows an intermediate pattern of the present invention.

FIG. 5 shows the steps 200 to generate the dither matrix 110. The first step, 202, is to generate an intermediate pattern, 300, using a special filter The elements with values equal to one and zero are substantially uniformly distributed within the pattern. FIG. 6 shows an example of the intermediate pattern 300 with 128 rows by 128 columns of elements. A dot implies the element at that position has a value of one, and a void implies the element at that position has a value of zero. The pattern shown in FIG. 6 has been enhanced the same way as the pattern in FIG. 1A.

Figure 7A:
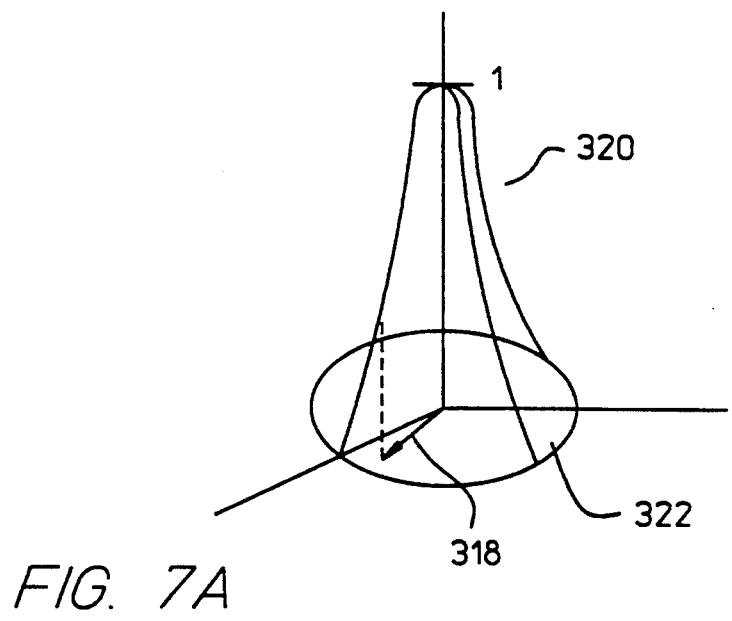
FIGS. 7A-G show a few preferred embodiments of the special filter.
Figure 7B:
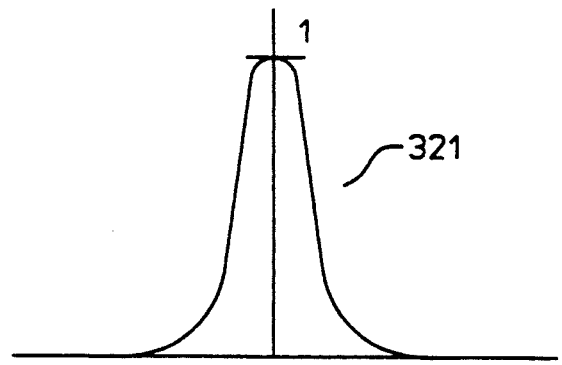
Figure 7C:
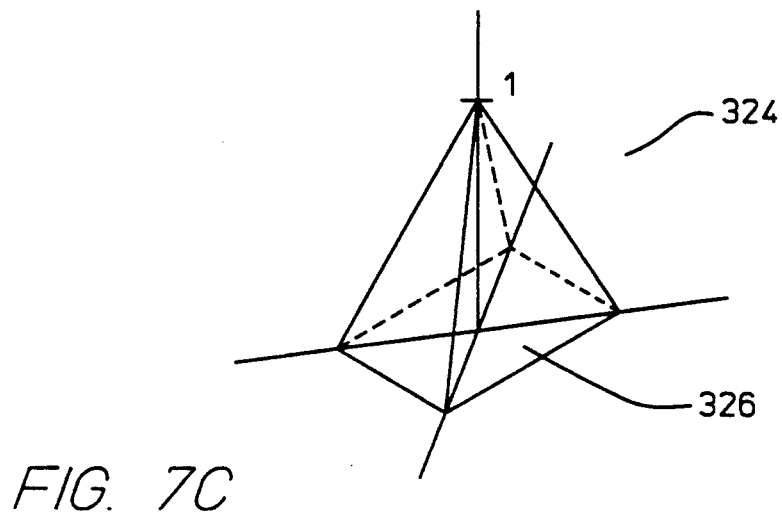
Figure 7D:
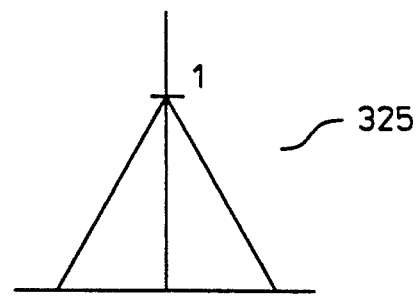
Figure 7E:
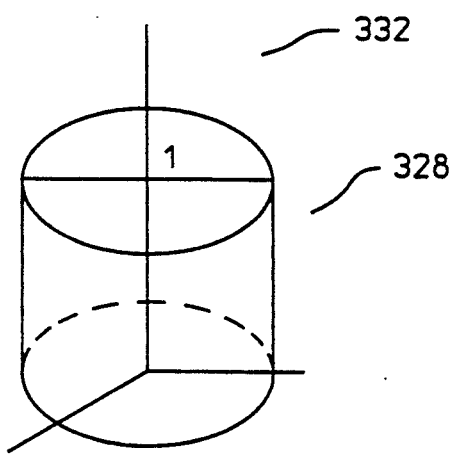
Figure 7F:
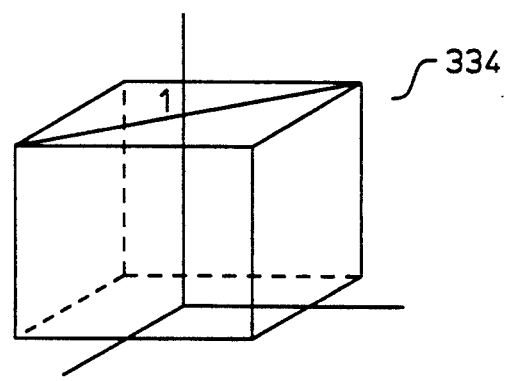
Figure 7G:
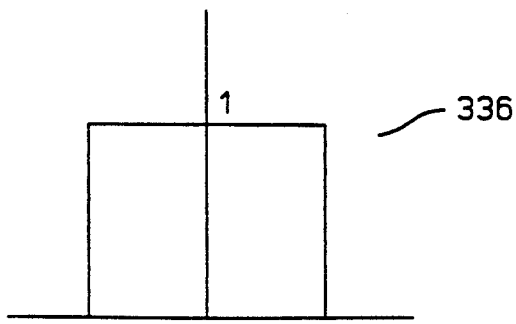

The special filter has a single peak at a normalized value of one. The response of the special filter only has positive values. The area covered by the filter when its response is 0.1% of its normalized peak value is defined as its region-of-support. The peak of the filter is positioned approximately at the center of its region-of-support. FIGS. 7A-G show a few preferred embodiments of the special filter. FIG. 7A shows a guassian filter 320 with a circular region-of-support 322. The profile of the filter can be described by the following equation:

$$y(d) = \exp \frac{-d^2}{2S^2}$$

where d, 318, is the distance from the center of the region-of-support, 322, to a point of interest; s is the sigma of the guassian filter and y is the response of the filter at the point of interest. FIG. 7B shows a cross section of FIG. 7A. FIG. 7C shows a triangular filter 324 with a region-of-support 326, and FIG. 7D shows a cross section 325 of FIG. 7C. FIG. 7E shows a rectangular filter 328 with a circular region-of-support 332; FIG. 7F shows another rectangular filter 334 with a rectangular region-of-support; and FIG. 7G shows a cross section 336 that can be for both FIGS. 7E and 7F. The guassian filter 320 is selected to illustrate the invention.

Referring back to FIG. 5, in the second step, 204, of the present invention, patterns of the dither matrix 110 with fewer elements having values equal to one than the intermediate pattern 300 are generated. This is done by replacing a plurality of ones with zeros from the intermediate pattern 300. The ones to be replaced are in regions where ones are clustered together, as identified by the filter. The difference in the number of elements having values equal to one, from one pattern to its next pattern, is dependent on a quantization number.

In the third step, 206, patterns of the dither matrix 110 with fewer zeros than the intermediate pattern 300 are generated. This is done through replacing a plurality of zeros with ones from the intermediate pattern 300. The zeros to be replaced are in regions with zeros clustered together, as identified by the filter. The difference in the number of elements having values equal to zero, from one pattern to its next pattern, is dependent on the quantization number.

Finally, in step four, 208, the dither matrix, 110, is formed by adding all the generated patterns to the intermediate pattern.

Steps two to four are not restricted to that sequence. Step three, 206, can be done before step two 204. Step four, 208, the summing step, can be performed as the patterns are generated. In other words, after the formation of the intermediate pattern, the pattern is copied to the dither matrix. Then, as each additional pattern is generated, it is added to the dither matrix by matrix addition. So, when all the patterns are generated, the dither matrix 110 is also formed.

In the present example, the grey scale image, 102, has 256 grey levels. This number of grey levels determines the number of grey level patterns in the halftone image 104 and the number of patterns in the dither matrix 110. So, the halftone image 104 has 256 grey level patterns, in varying levels of lightness, including two end levels, the level with no dots and the level entirely covered with dots. Each grey level pattern corresponds to one pattern of the dither matrix. For the dither matrix, 110, it has 128 rows by 128 columns of elements. The difference in the number of elements having values equal to one between a pattern in the dither matrix and its next pattern is dependent on the quantization number, which is the round-off of ((128 * 128)/255) or 64.

Figure 8:
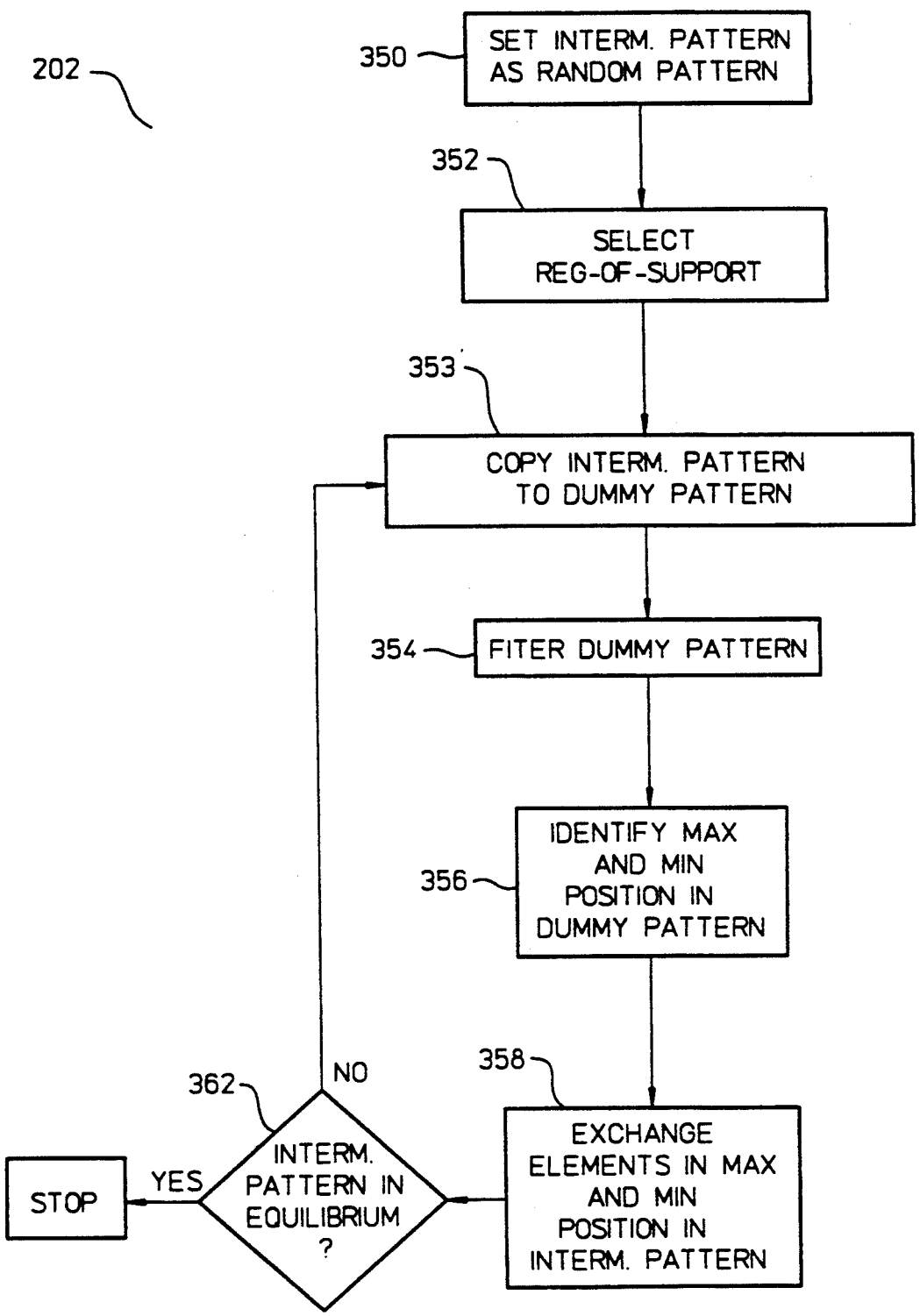
FIG. 8 describes the steps of generating the intermediate pattern in the present invention.

FIG. 8 describes the step, 202, of generating the intermediate pattern, 300, in more detail. The values of the elements in the intermediate pattern can start, 350, from any pattern of ones and zeros, as long as there are at least (100/255) percent of the elements having values equal to one and at least (100/255) percent having values equal to zero. In one preferred embodiment, the values start from a random pattern, with ones and zeros randomly distributed. Then, a region-of-support for the filter is selected, 352.

Figure 9:
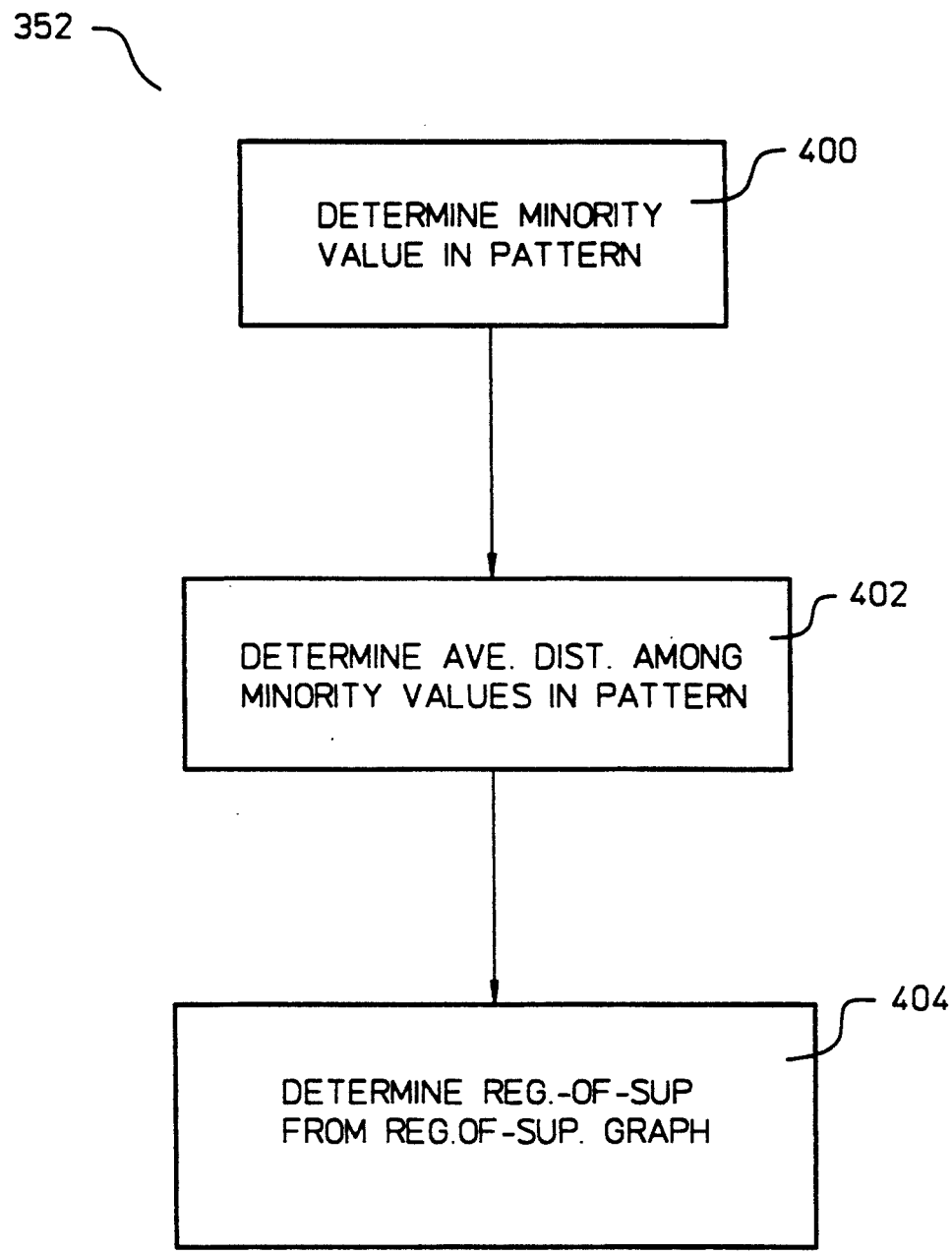
FIG. 9 describes the steps to select a region-of-support of the special filter for the present invention from a pattern.
Figure 10:
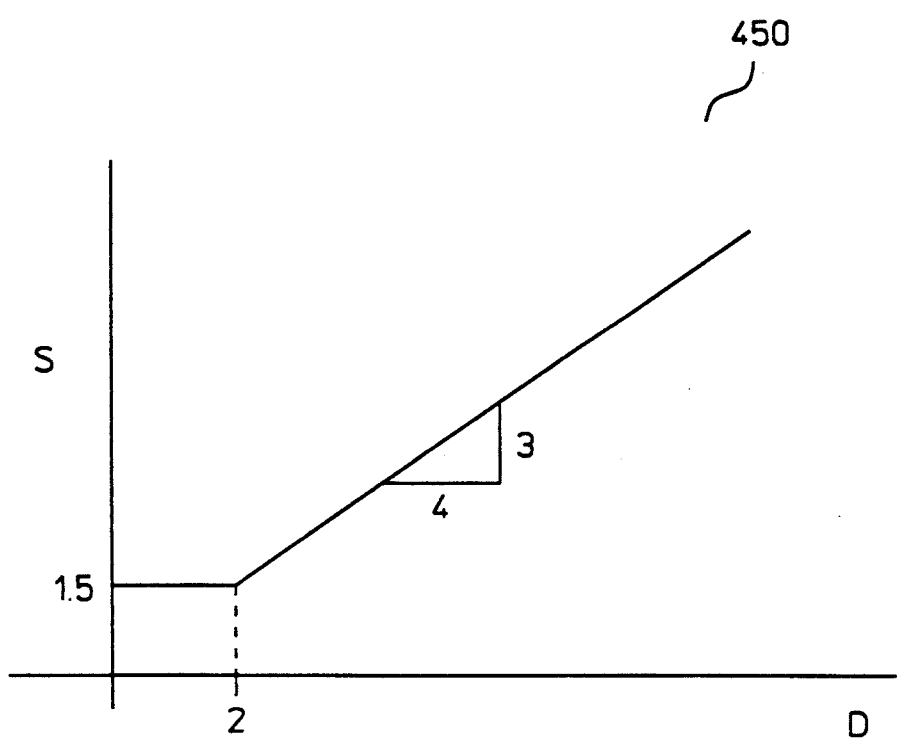
FIG. 10 illustrates a region-of-support graph of the present invention.

FIG. 9 describes the steps to select a region-of-support of a filter from a pattern. In the present case, the region-of-support 322 is selected for the guassian filter 320 from the intermediate pattern 300. The first step, 400, is to find the minority value in the pattern. The values of the elements in the pattern are either one or zero. The minority value is the value that fewer elements have, as compared to the other value. If, by coincidence, half of the elements have values equal to zero, and half one, then one is selected to be the minority value. After y value is found, the average separation D among the elements with the minority value in the pattern is calculated, 402. In one preferred embodiment, this is done by dividing the total number of elements in the pattern by the number of elements with the minority value and then taking the square root of the result. The value for D is applied to a region-of-support graph 450, as shown in FIG. 10, to get s, the sigma of the guassian filter 320. The diameter of the circular region-of-support is related to the sigma s. In the present example, the diameter is equal to about 3.7 * s. From its diameter, the region-of-support of the guassian curve is found, 404.

The region-of-support graph 450 is generated by trial and error, through human visual response. The graph is a substantially nondecreasing function. This is because as the average separation D of the minority value elements increases, the guassian filter has to cover a larger area to perform a meaningful filtering. If the guassian filter does not cover a large enough area, the filtered output would be the same as its input. For the filter to cover a larger area, its sigma has to increase. Based on this idea, region-of-support graphs with different values were applied to the present invention. By trial and error, the region-of-support graph as shown in FIG. 10 was found to provide substantially uniform patterns for the dither matrix.

In the present example, when D is less than 2, the sigma s is constant and is equal to 1.5; and when D is more than 2, the sigma s is related to D by a straight line with a slope of 0.7. It should be obvious to those skilled in the art that constant values different from 1.5 (such as values ranging from 1 to 2) and slopes different from 0.7 (such as values ranging from 0.5 to 1) can be used for the present invention.

Referring back to FIG. 8, after the region-of-support 322 of the guassian filter 320 is selected to define the guassian filter 320, the next step is to copy, 353, the intermediate pattern 300 to a dummy pattern. The dummy pattern is then filtered, 354, by the special filter 320. The dummy pattern is duplicated two dimensionally before it is filtered. This is known as circular convolution. A general discussion on the filtering process can be found in "Discrete Time Signal Processing," written by A. V. Opponheim and R. W. Schafer, Prentice Hall, 1989, and will not be further described in this application.

The filtered output has the largest value at the location where elements with values equal to one are most clustered together, and the smallest value at the location where elements with values equal to zero are most clustered together or where there is the largest void. The position with the largest value is identified as the maximum position, and the position with the smallest value is identified as the minimum position, 356. If there are locations that are equally clustered or voided, then there will be more than one maximum or minimum position. In one preferred embodiment, the first position found to be the maximum and having a value of one in its corresponding position in the intermediate pattern is selected to be the maximum position. Similarly, the first position found to be the minimum and having the value of zero in its corresponding position in the intermediate pattern is selected to be the minimum position.

After the maximum and the minimum position are identified, 356, their elements in the intermediate pattern, 300, are exchanged, 358.

The above steps of copying, 353, filtering, 354, identifying, 356, and exchanging, 358, are repeated, 362, one or more times until the intermediate pattern reaches an equilibrium state, such as the example shown in FIG. 6.

At that point, the elements with values equal to one are substantially uniformly distributed within the pattern.

Figure 11:
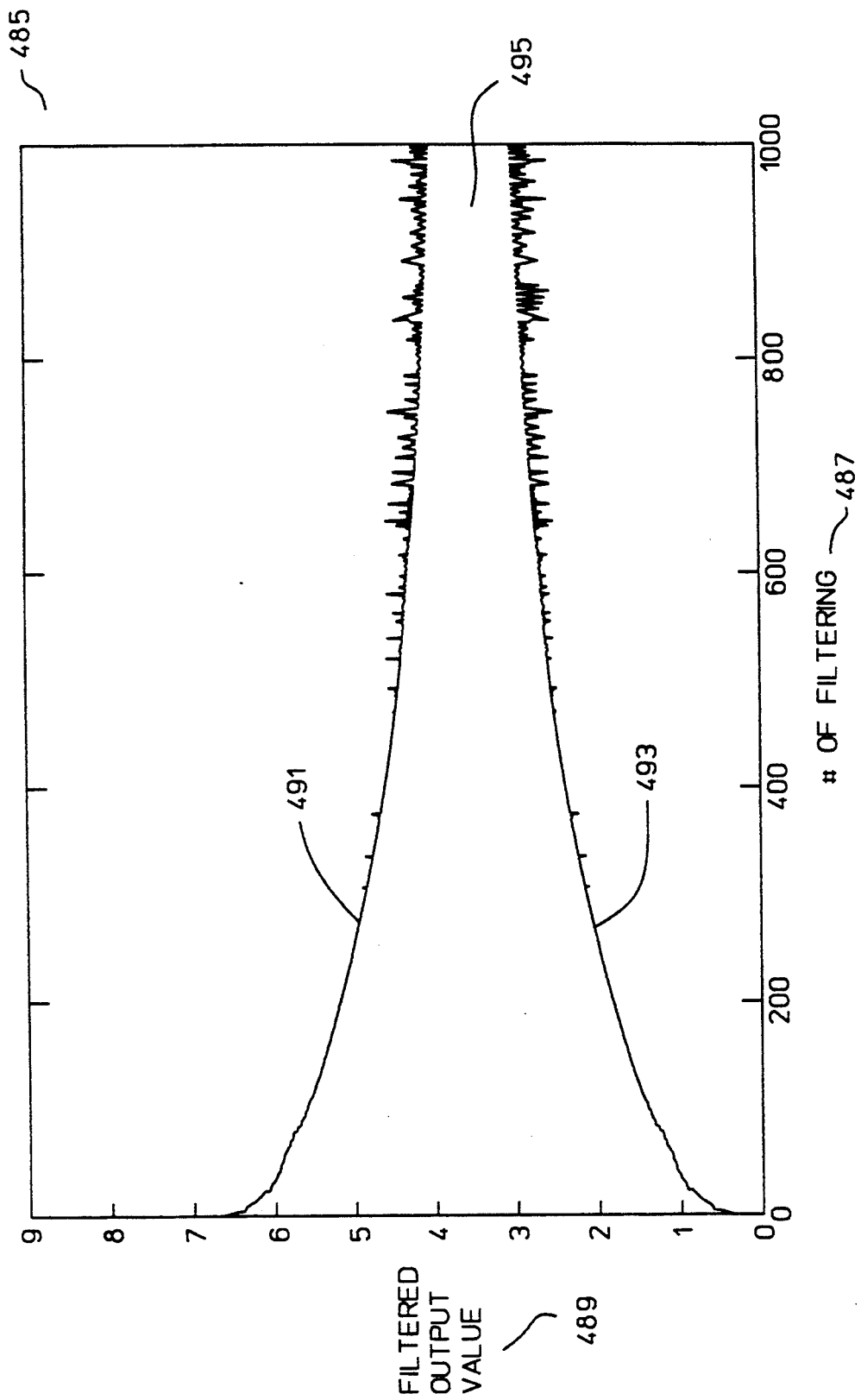
FIG. 11 shows a filtered output graph of the present invention.

A quantitative way to describe the equilibrium state is to compare the largest and the smallest value of the filtered output. FIG. 11 shows the filtered output graph 485. The curve 491 represents the largest filtered output value as a function of the numbers of times of filtering, 487. The curve 493 represents the smallest filtered output value as a function of the numbers of times of filtering, 487. The difference between the largest and the smallest value in the filtered output decreases with more filtering until the pattern reaches its equilibrium state, 495. At the equilibrium state, 495, the difference in the largest and the smallest filtered output remains substantially constant. In one example, before filtering, the difference is about 7.7. At the equilibrium state, the difference is about 1.5.

Figure 12:
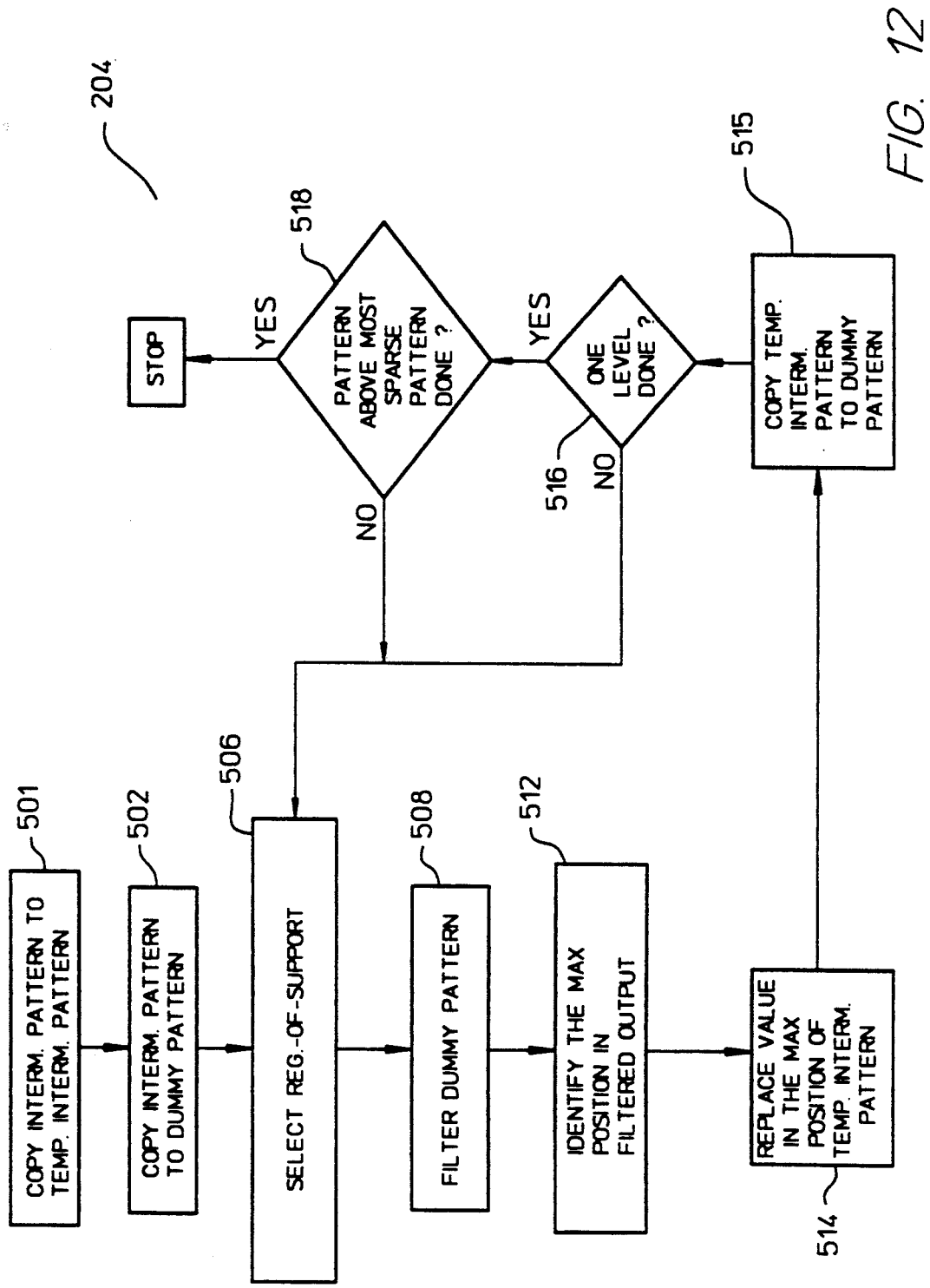
FIG. 12 describes the steps of generating patterns of the dither matrix in the present invention with fewer ones than the intermediate pattern.

The dither matrix, 110, requires one or more patterns with elements having fewer ones. FIG. 12 describes the step, 204, of generating patterns of the dither matrix 110 with fewer ones than the intermediate pattern in more detail.

In generating the many patterns with fewer ones, first, the intermediate pattern, 300, is copied, 501, to a temporary-intermediate pattern, and is also copied, 502, into a dummy pattern. Then, a region-of-support 322 of the guassian filter 320 is selected, 506. The selection process, 506, has been previously described and illustrated in FIGS. 9 and 10, and will not be further described. From the region-of-support 322, the filter 320 is defined. The dummy pattern is then filtered, 508, to identify the position of the dummy pattern where ones are substantially most clustered as the maximum position. The identification step is similar to the methods described above and will not be further described here. The value of the element in the maximum position of the temporary-intermediate pattern is replaced, 514, with a zero. Then, the values of the temporary-intermediate pattern are copied, 515, to the dummy pattern. In one preferred embodiment, the above steps of selecting, 506, filtering, 508, identifying, 512, replacing, 514, and copying, 515, are repeated, 516, the quantization number of times or 64 times to generate one pattern of the dither matrix. In another embodiment, the repeating steps do not include the step of selecting, 506, the region-of-support. Instead, the repeating step, 516, starts at the step of filtering the dummy pattern, 508.

The process of generating one pattern of the dither matrix 110 with fewer ones are repeated, 518, from the selecting step, 506, until the ones in the temporary-intermediate pattern is less than or equal to the quantization number. At that point, the pattern above the most sparse pattern is generated, and the repeating step, 518, stops. This is because the most sparse pattern is the pattern with all elements having values equal to zero.

The number of elements with values equal to one decreases as more patterns with fewer ones are generated. The average separation among those elements increases, and the sigma of the filter increases correspondingly. Thus, all the patterns generated, even those in the highlight regions or the light grey level patterns, are substantially uniform.

Figure 13:
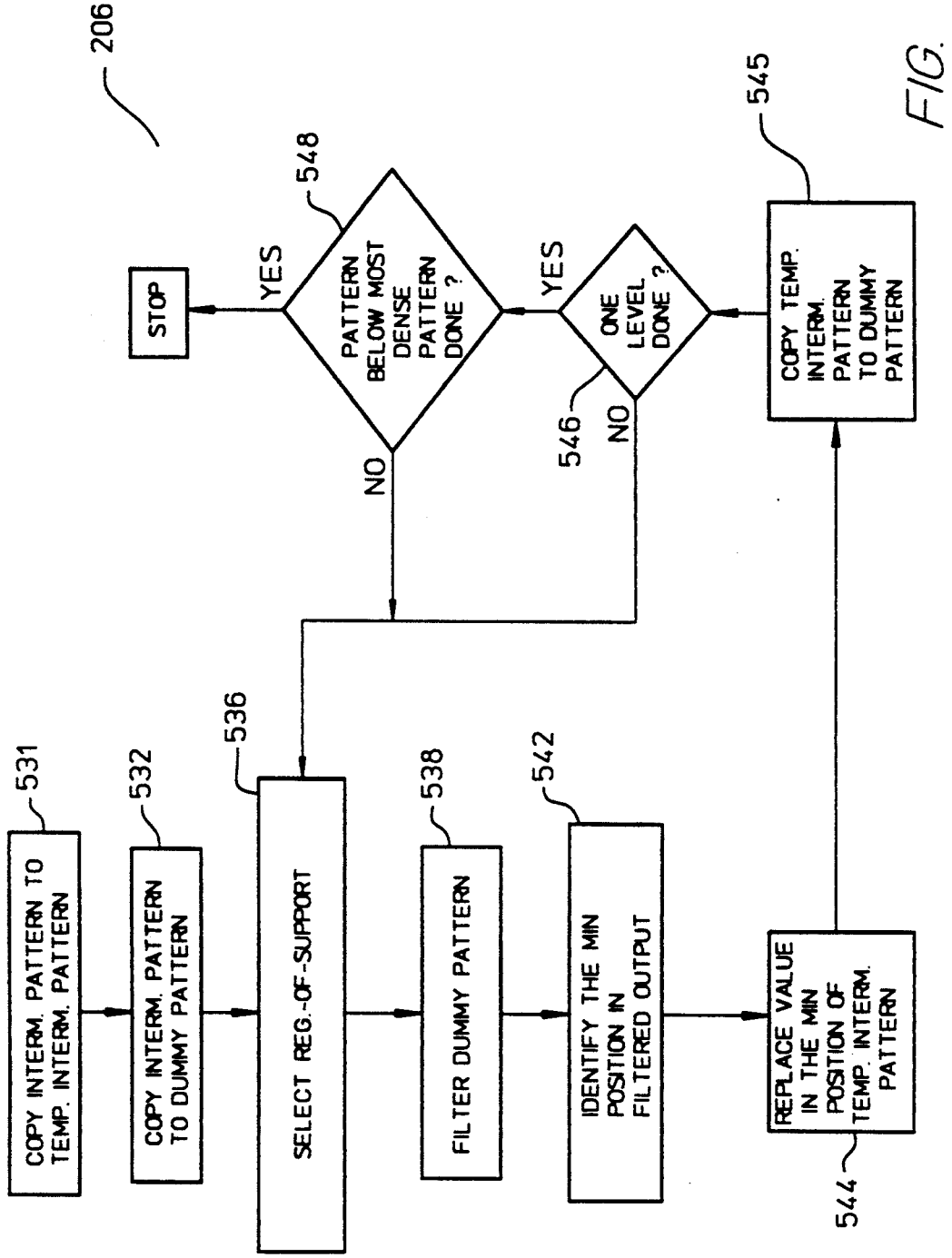
FIG. 13 describes the steps of generating patterns of the dither matrix in the present invention with fewer zeros than the intermediate pattern.

The dither matrix 110 also requires one or more patterns with fewer zeros. FIG. 13 describes the step, 206, of generating patterns of the dither matrix 110 with fewer zeros than the intermediate pattern in more detail. The steps shown in FIG. 13 are similar to the steps shown in FIG. 12. First, the intermediate pattern is copied, 531, into a temporary-intermediate pattern, and is also copied, 532, into a dummy pattern. Then, a region-of-support for the guassian filter is selected, 536, to define the filter. After the filter is defined, the dummy pattern is filtered, 538, to identify, 542, the position where zeros are most clustered together as the minimum position. The element in the minimum position of the temporary-intermediate pattern is replaced, 544, by a one; and the temporary-intermediate pattern is again copied, 545, to the dummy pattern. In one embodiment, the steps of selecting, 536, filtering, 538, identifying, 542, replacing, 544, and copying, 545, are repeated, 546, the quantization number of times to generate one pattern for the dither matrix, 110. In another embodiment, the repeating steps do not include the step of selecting, 536, the region-of-support. Instead, the method repeats at the step of filtering the dummy pattern, 538.

The above process of generating one pattern, 548, repeats to generate more patterns with fewer zeros until the number of zeros in the temporary-intermediate pattern is less than or equal to the quantization number. At that point, the pattern below the most dense pattern is generated, and the repeating step stops. This is because the most dense pattern is the pattern entirely filled with elements having values equal to one.

Figure 1A:
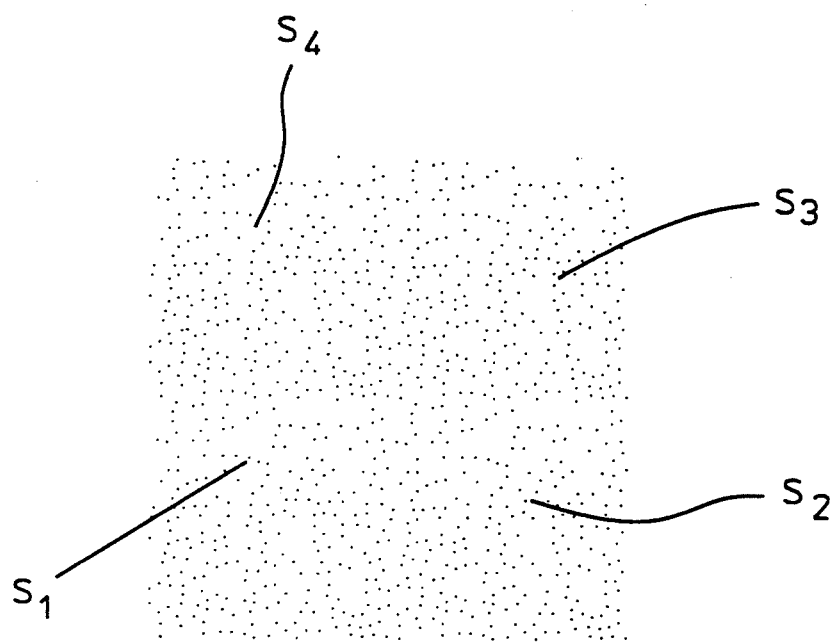
FIG. 1A shows a prior art grey level pattern of a halftone image.
Figure 1B:
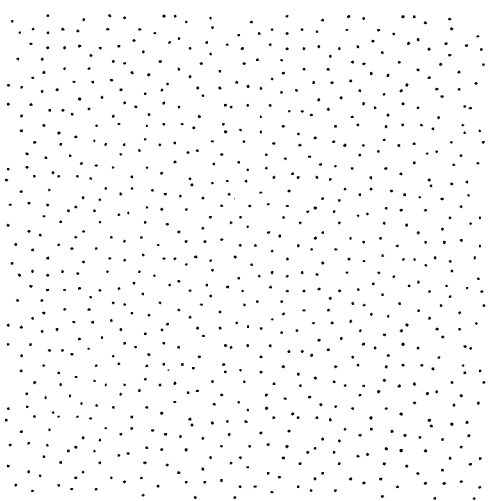

All the elements with values equal to one in every pattern of the dither matrix 110 are substantially uniformly distributed across the pattern. FIGS. 1B–C show two patterns of the dither matrix 110. The ones in the patterns are represented by a dot. FIG. 1B has the same number of dots as FIG. 1A, and represents a highlight region. Comparing the pattern in FIG. 1B to that in FIG. 1A, the pattern in FIG. 1B is substantially more uniform. Thus, the halftone image 104 generated by the pattern of the dither matrix of the present invention does not have the substantial non-uniformities as in FIG. 1A. FIG. 1C shows another pattern generated by the present invention with more elements having values equal to one.

One way to quantitatively define a pattern to be substantially uniform is to filter the pattern as described above. In fact, that is what one is doing when one is looking at the pattern because eyes are filters. Thus, visually, one can see that the pattern in FIG. 1B is more uniform than the pattern in FIG. 1A.

The filtering process to define the uniformity of a pattern again starts at selecting a filter as described above and in FIGS. 9 and 10. The pattern is then filtered by the selected filter, and the difference between the maximum and minimum values in the filtered outputs is found. This filter selection and filtering process is applied to all the generated patterns. FIG. 14 is a difference graph 600 showing the differences between the maximum and minimum values 602 versus the different patterns generated 604. Each pattern generated is designated a number. The higher the pattern number, the fewer the number of elements having values equal to one are in the pattern. In this example, there are 256 patterns. The calculated differences for all the patterns are plotted as the jagged line 606. The difference value for each pattern is of the same order of magnitude as 495 in FIG. 11. They are all less than 1.5. A pattern that is substantially uniform is a pattern whose difference value is substantially minimized, as those shown in FIG. 14.

Other embodiments of the invention will be apparent to the skilled in the art from a consideration of this specification or practice of the invention disclosed herein. All publications cited in this specification are incorporated by reference. It is intended that the specification and examples be considered as exemplary only, with the true scope and spirit of the invention being indicated by the following claims.

I claim:

1. A method of generating a halftone image from a grey scale image by means of a dither matrix,
   the halftone image, the grey scale image and the dither matrix each occupying an area, the three areas being substantially equal to each other,
   the halftone image and the grey scale image each having a plurality of pixels, each pixel having a value, and
   the dither matrix having a plurality of elements that are generated by a plurality of patterns, each pattern also having a plurality of elements, each element in each pattern occupying a position in the pattern, each element having a value,
   the method comprising the steps of comparing the value of each pixel of the grey scale image with the value of an element in the dither matrix and, based on the result of the comparison, determining the value of a corresponding pixel of the halftone image, and
   the value of each element in each pattern of the dither matrix being determined by a single-peaked and positive filter with a region-of-support, the peak being approximately at the center of the region-of-support, and
   for a given pattern, the region-of-support being dependent on the average separation of a pre-selected value in that pattern, such that all elements with the preselected values are substantially uniformly distributed across the pattern.

2. A method of generating a halftone image as recited in claim 1, wherein the value of each element in each pattern being determined from a random pattern that has elements of randomly distributed maximum and minimum values.

3. A method of generating a halftone image as recited in claim wherein the filter is a guassian filter.

4. A method of generating a halftone image as recited in claim 1, wherein the filter is a rectangular filter.

5. A method of generating a halftone image as recited in claim wherein the filter is a triangular filter.

6. A method of generating a halftone image as recited in claim wherein the image is in black-and-white.

7. A method of generating a halftone image as recited in claim 1, wherein the image is in color.

8. A method of generating a halftone image as recited in claim 2, wherein the dither matrix is generated by the steps of:
   generating an intermediate pattern having a plurality of elements, each element having either the maximum or the minimum value, the maximum value being the pre-selected value; and
   generating a plurality of other patterns, each pattern having a different number of elements having the maximum value than the intermediate pattern, and summing the intermediate pattern and the plurality of other patterns to get the dither matrix.

9. A method of generating a halftone image as recited in claim 8, wherein the step of "generating a plurality of other patterns" further comprises the steps of:
   generating one or more pattern with fewer elements having the maximum value than the intermediate pattern; and
   generating one or more pattern with fewer elements having the minimum value than the intermediate pattern.

10. A method of generating a halftone image as recited in claim 8, wherein the step of "generating an intermediate pattern" further comprises:
    using the random pattern as the starting pattern for the intermediate pattern;
    selecting a region-of-support for the filter based on the intermediate pattern;
    copying the intermediate pattern into a dummy pattern;
    filtering the dummy pattern by the filter;
    identifying from the filtered output the position having the element with the largest value as the maximum position and identifying the position having the element with the smallest value as the minimum position;
    exchanging elements in the maximum and minimum position of the intermediate pattern; and
    repeating from the step of "copying" until the intermediate pattern reaches an equilibrium state.

11. A method of generating a halftone image as recited in claim 10, wherein the step of "selecting a region-of-support" further comprises:
    finding a minority value in the pattern;
    determining the average separation D among the elements with the minority value in the pattern; and
    determining the region-of-support from a region-of-support graph in which the region-of-support is related to D by a substantially nondecreasing function.

12. A method of generating a halftone image as recited in claim 10, wherein the intermediate pattern has reached the equilibrium state when the difference between the largest and the smallest value in the filtered output remains substantially constant with additional filtering.

13. A method of generating a halftone image as recited in claim 9, wherein the step of "generating one or more pattern with fewer elements having the maximum value" further comprises:
    copying the intermediate pattern into a dummy pattern;
    selecting a region-of-support for the filter based on the intermediate pattern;
    filtering the dummy pattern by the filter;
    identifying from the filtered output the position having the element with the largest value as the maximum position;
    replacing the element in the maximum position of the intermediate pattern with the minimum value;
    copying the intermediate pattern into the dummy pattern;
    repeating from the "selecting" step a quantization number of times to generate one pattern of the dither matrix; and
    repeating from the "selecting" step until the number of elements having the maximum value in the intermediate pattern is less than or equal to the quantization number.

14. A method of generating a halftone image as recited in claim 13, wherein the step of "selecting a region-of-support for the filter" further comprises the steps of:
    finding a minority value in the pattern;

determining the average separation D among the elements with the minority value in the pattern; and determining the region-of-support from a region-of-support graph in which the region-of-support is related to D by a substantially nondecreasing function.

15. A method of generating a halftone image as recited in claim 9, wherein the step of "generating one or more pattern with fewer elements having the maximum value" further comprises:

copying the intermediate pattern into a dummy pattern;

selecting a region-of-support for the filter based on the intermediate pattern;

filtering the dummy pattern by the filter;

identifying from the filtered output the position having the element with the largest value as the maximum position;

replacing the element in the maximum position of the intermediate pattern with the minimum value;

copying the intermediate pattern into the dummy pattern;

repeating from the "filtering" step a quantization number of times to generate one pattern of the dither matrix; and repeating from the "selecting" step until the number of elements having the maximum value in the intermediate pattern is less than or equal to the quantization number.

16. A method of generating a halftone image as recited in claim 9, wherein the step of "generating one or more pattern with fewer elements having the minimum value" further comprises:

copying the intermediate pattern into a dummy pattern;

selecting a region-of-support for the filter based on the intermediate pattern;

filtering the dummy pattern by the filter;

identifying from the filtered output the position having the element with the smallest value as the minimum position;

replacing the element in the minimum position of the intermediate pattern with the maximum value;

copying the intermediate pattern into the dummy pattern;

repeating from the "selecting" step a quantization number of times to generate one pattern of the dither matrix; and repeating from the "selecting" step until the number of elements having the minimum value in the intermediate pattern is less than or equal to the quantization number.

17. A method of generating a halftone image as recited in claim 16, wherein the step of "selecting a region-of-support for the filter" further comprises the steps of:

finding a minority value in the pattern;

determining the average separation D among the elements with the minority value in the pattern; and determining the region-of-support from a region-of-support graph in which the region-of-support is related to D by a substantially nondecreasing function.

18. A method of generating a halftone image as recited in claim 9, wherein the step of "generating one or more pattern with fewer elements having the minimum value" further comprises:

copying the intermediate pattern into a dummy pattern;

selecting a region-of-support for the filter based on the intermediate pattern;

filtering the dummy pattern by the filter;

identifying from the filtered output the position having the element with the smallest value as the minimum position;

replacing the element in the minimum position of the intermediate pattern with the maximum value;

copying the intermediate pattern into the dummy pattern;

repeating from the "filtering" step a quantization number of times to generate one pattern of the dither matrix; and repeating from the "selecting" step until the number of elements having the minimum value in the intermediate pattern is less than or equal to the quantization number.

19. A method of generating a halftone image as recited in claim 1, wherein:

the dither matrix has n by m elements;

the dither matrix has p patterns;

each element has a value that is either one or zero; and the difference in the number of elements having values equal to one between a pattern and its next pattern is dependent on $(m*n)/(p-1)$.

* * * * *